United States Patent
Wang et al.

(10) Patent No.: US 7,206,688 B2
(45) Date of Patent: Apr. 17, 2007

(54) CONTROL SYSTEM FOR ENGINES HAVING MULTIPLE COMBUSTION MODES

(75) Inventors: Junmin Wang, San Antonio, TX (US); Jayant V. Sarlashkar, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 11/264,211

(22) Filed: Nov. 1, 2005

(65) Prior Publication Data

US 2006/0122763 A1 Jun. 8, 2006

Related U.S. Application Data

(60) Provisional application No. 60/624,014, filed on Nov. 1, 2004.

(51) Int. Cl.
*F02D 41/00* (2006.01)
*G06F 17/00* (2006.01)

(52) U.S. Cl. ....................... 701/103; 123/295

(58) Field of Classification Search ........... 701/103, 701/105, 102, 110; 123/295, 299, 304
See application file for complete search history.

(56) References Cited

U.S. PATENT DOCUMENTS

| | | | | |
|---|---|---|---|---|
| 5,875,743 A | * | 3/1999 | Dickey | 123/568.21 |
| 6,032,639 A | * | 3/2000 | Goto et al. | 123/295 |
| 6,497,212 B2 | * | 12/2002 | Matsumoto et al. | 123/295 |
| 6,561,157 B2 | | 5/2003 | zur Loye et al. | 123/295 |
| 6,684,849 B2 | | 2/2004 | zur Loye et al. | 123/295 |
| 2004/0149255 A1 | | 8/2004 | zur Loye et al. | 123/295 |

FOREIGN PATENT DOCUMENTS

| EP | 1 088 978 A2 * | 4/2001 |
|---|---|---|
| JP | 2005-155473 A * | 6/2005 |

* cited by examiner

*Primary Examiner*—Hieu T. Vo
(74) *Attorney, Agent, or Firm*—Baker Botts L.L.P.

(57) ABSTRACT

A system and method for modeling and controlling an internal combustion engine having multiple combustion modes. The in-cylinder condition is controlled by gas handling devices through both a feed forward and feedback path. The latter path includes an "in-cylinder condition estimator" and a non-linear controller. Fueling parameters are controlled by engine speed, desired torque, and input from the in-cylinder condition estimator.

12 Claims, 3 Drawing Sheets

$$\begin{Bmatrix} \dot{M}_{Oxy} \\ \dot{M}_{Inert} \\ \dot{T} \\ \vdots \end{Bmatrix} = \begin{Bmatrix} f_1(x) \\ f_2(x) \\ f_3(x) \\ \vdots \end{Bmatrix} + \begin{Bmatrix} g_{11}(x) \\ g_{12}(x) \\ g_{13}(x) \\ \vdots \end{Bmatrix} \theta_{Thr} + \begin{Bmatrix} g_{21}(x) \\ g_{22}(x) \\ g_{23}(x) \\ \vdots \end{Bmatrix} \theta_{EGR} + \begin{Bmatrix} g_{31}(x) \\ g_{32}(x) \\ g_{33}(x) \\ \vdots \end{Bmatrix} \theta_{SCV} + \begin{Bmatrix} g_{41}(x) \\ g_{42}(x) \\ g_{43}(x) \\ \vdots \end{Bmatrix} \theta_{VGT} + \begin{Bmatrix} g_{51}(x) \\ g_{52}(x) \\ g_{53}(x) \\ \vdots \end{Bmatrix} \phi_{VVA} + \cdots + \Delta$$

*FIG. 6*

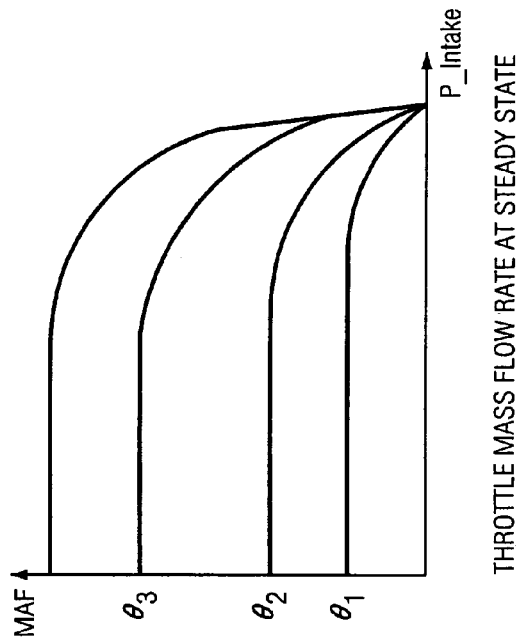

*FIG. 7*

CONTROL SYSTEM FOR ENGINES HAVING MULTIPLE COMBUSTION MODES

CROSS-REFERENCE TO RELATED APPLICATIONS

This application claims the benefit of U.S. Provisional Application Ser. No. 60/624,014 filed Nov. 1, 2004, which is incorporated herein by reference in its entirety.

TECHNICAL FIELD OF THE INVENTION

This invention relates to engine control systems, and more particularly to control systems for engines having multiple combustion modes.

BACKGROUND OF THE INVENTION

Modern efforts to reduce engine emissions and enhance engine performance have resulted in investigation into alternative engine combustion modes. Alternative combustion modes have been implemented for various types of engines.

For example for diesel engines, it has become apparent that conventional diesel combustion (heterogeneous charge compression ignition) can not alone meet the expected emission levels. The compression-ignition direct-injection (CIDI) engine is an advanced version of commonly known diesel engines, and is a promising technology for light-duty vehicles. It is suited to both conventional and hybrid electric power train configurations.

For diesel engines, alternative combustion modes include homogeneous charge compression ignition, low temperature combustion, and premixed charge compression ignition. Each of these alternate combustion modes has its own operating characteristics and requirements, such as emissions, speed-torque range, in-cylinder conditions, and fueling.

It further appears that combustion improvements alone may not be sufficient to meet emissions standards. More specifically, it may be necessary to use exhaust treatment devices in conjunction with combustion improvements. These treatment devices have their own operating characteristics, and some such devices require periodic regeneration.

To achieve emissions goals and satisfy engine requirements, the use of multiple combustion modes for the same engine is another concept being investigated. In particular, emissions treatment systems have operating requirements, such as gas composition and bed temperature, that must be satisfied over the speed-torque operating range of the engine. This can be accomplished by using different combustion modes for different operating conditions. For example, for a particular engine, a conventional combustion mode is used for starting and at higher loads, and a low-temperature combustion mode is used at light to moderate loads.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 6 illustrates a dynamic equation for the in-cylinder condition.

FIG. 7 variation of the effectiveness of the throttle valve versus intake manifold pressure at different opening positions.

DETAILED DESCRIPTION OF THE INVENTION

Figure 1:
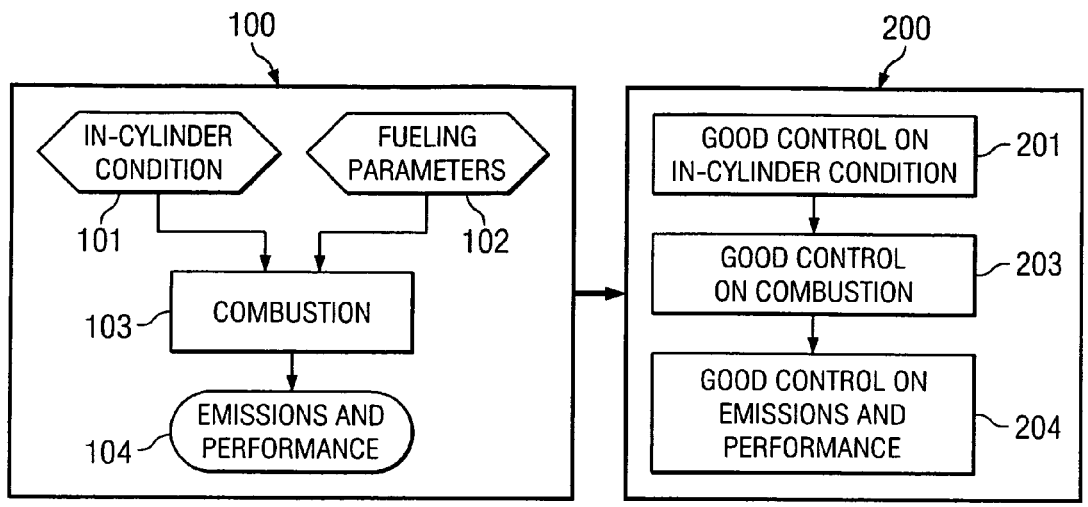
FIG. 1 is a process diagram of an internal combustion engine and its control system.

As stated in the Background, to optimize performance and meet emissions requirements, engines having multiple combustion modes are being developed. For purposes of this description, a modeling and control system is described for use with diesel engines having multiple combustion modes, but the same concepts could be applied to any fuel combustion engine.

For diesel engines, sophisticated alternate combustion modes such as homogeneous charge compression ignition (HCCI), low temperature combustion (LTC), and premixed charge compression ignition (PCCI) are being actively developed and implemented along with conventional diesel combustion. These alternate combustion modes offer great potential to reduce the engine emission levels without significant loss of performance.

Alternate combustion modes, with their advantages and shortcomings, have respective characteristics in terms of combustion, emissions, applicable speed-torque range, required in-cylinder conditions, and fueling. For example, the required local equivalence ratios and local temperatures are different for different combustion modes.

Exhaust treatment devices have their own operating characteristics and need to be periodically regenerated. During regeneration, in-cylinder combustion must be very different from that at normal operations to produce required exhaust conditions (such as rich exhaust gas).

It has now become clear that it is difficult to cover the entire speed-torque range (required by the vehicle application) and satisfy the operating requirements of the exhaust treatment systems (gas composition and bed temperature being the most important ones) by only using one or two combustion modes. To optimize the overall engine performance and emissions while maintain the functionality of the exhaust treatment systems, it is necessary to use different multiple combustion modes and sub-modes over the whole speed-torque operating region.

Given the fact that the applicable speed-torque ranges and the purposes of these combustion modes are quite different, it is necessary to switch combustion modes. However, because the in-cylinder condition requirements of these combustion modes are quite different and some combustion modes are close to the edge of unstable combustion while very sensitive to the in-cylinder condition, it is challenging to achieve smooth, fast, and robust mode switching without sacrificing performance and emissions reduction.

At steady-state, with proper calibration, each combustion mode can meet the corresponding requirements of the power, emissions, and exhaust treatment systems very well. However, in a real vehicle application, there is almost no steady-state situation and any implementation of an engine with multiple combustion modes on a vehicle must contend with combustion mode switching carefully. During mode switching, sophisticated control approaches are required to achieve smooth, fast, and robust transition. The degree of the challenge and complexity for the engine control system increases rapidly as more combustion modes are employed.

An engine with multiple combustion modes, as a multivariable, highly coupled, and nonlinear system, becomes much more complicated than an engine with only the conventional combustion mode. Classical linear control with ad hoc approaches is not able to produce acceptable performance. Advanced nonlinear control approaches are necessary to meet combustion, emissions and vehicle application requirements. Nonlinear modeling and control is currently an active research area, but the research is directed to engines with only a single conventional combustion mode.

Systematic nonlinear modeling and control approaches for an engine having multiple combustion modes have not yet been established and need to be explored. The invention described herein is aimed at developing advanced multivariable nonlinear modeling and control. More specifically, an object of the invention is systematic, fast, and robust in-cylinder condition control approaches for implementing multiple combustion modes, which could include existing combustion modes and/or new combustion modes as they appear in the future. More specifically, control-oriented nonlinear dynamic models can be built, especially for the engine intake system. Dynamic models can be obtained either from reduction of the complex physics models or by using nonlinear system identification techniques based on experimental data. Based on these models, a nonlinear in-cylinder condition control system can be designed, implemented, and experimentally verified.

FIG. 1 is a high level process diagram, illustrating the performance of an engine and emissions system 100, and how that performance is affected by a control system 200. It is assumed that system 100 has one or more combustion modes.

Engine combustion 103 is decided by two main factors: the in-cylinder condition 101 and the fueling parameters 102. Different combustion modes can be achieved with the appropriate in-cylinder condition and fueling parameters.

The in-cylinder condition 100 can be defined by several parameters. Examples are the in-cylinder oxygen amount, in-cylinder inert gas amount, temperature, and swirl level. Quantitative values of these in-cylinder conditions can be measured or estimated by using sensors (mass airflow sensor, intake manifold pressure/temperature sensors) and models.

Fueling parameters 102 typically include injection pattern (single, double, post injection, etc.), injection timing and injection quantity for each injection event, as well as injection pressure.

Depending on the actual combustion modes employed by the engine, more parameters can be included in the scopes of both the in-cylinder condition and the fueling parameters.

Fueling parameters 102 are generally capable of being changed instantaneously. An exception is injection pressure, but delays in pressure changes do not affect the combustion much for small variations. Assuming there are no dynamics involved in the injection timing and injection quantity, fuel can be delivered to the combustion chamber as precisely as desired in a given combustion cycle.

On the other hand, the in-cylinder condition 100 is a slow and non-linear dynamic process due to factors such as intake/exhaust manifold filling and emptying dynamics, EGR (exhaust gas recirculation) delay, and the complexity of the turbocharger operation. Multiple combustion cycles are required to reach a given in-cylinder condition, and sophisticated control must be asserted for the in-cylinder condition.

With respect to control system 200, a good control system for the in-cylinder condition 201 results in good combustion control 203. This in turn, permits good engine emissions and performance 104 to be achieved.

Due to the complexity and nonlinearity of the engine and emissions system 100, sophisticated control theories and technologies need to be used. The challenges are many, with two main challenges being drivability and frequency of combustion mode switching.

With respect to drivability, the slow time scale of changing the in-cylinder condition makes smooth mode switching difficult. With respect to frequency of mode switching, expected performance and emissions can be met, with proper controller calibration, while in a given combustion mode. However, these metrics (performance and emissions) may be less than satisfactory during combustion mode switching. Thus, it is important to reduce the frequency of the mode switching and transition time.

Figure 2:
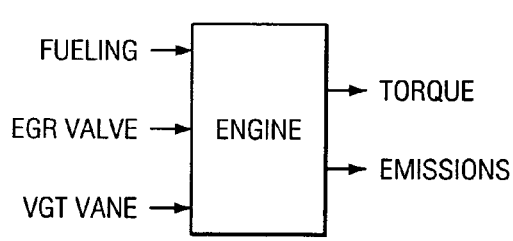
FIG. 2 illustrates various actuators for a conventional diesel engine.
Figure 3:
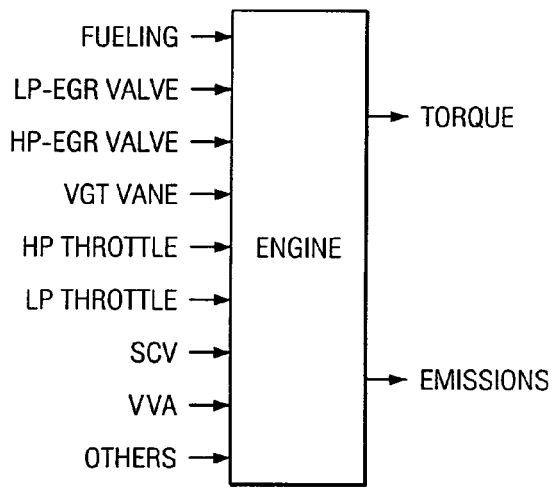
FIG. 3 illustrates various actuators for diesel engines now being developed.

FIG. 2 illustrates conventional diesel engine actuations, which typically only include VGT, EGR and fueling. FIG. 3 illustrates the increased number of actuations for an upcoming diesel engine with multiple combustion modes. To achieve new combustion modes, more in-cylinder condition handling devices (double throttle valves (high-pressure throttle, low-pressure throttle), dual EGR loops (high-pressure EGR, low-pressure EGR), variable valve actuation (VVA), swirl control valve (SCV) etc.) are employed and more in-cylinder condition variables are defined. These make the system significantly more complicated.

Sophisticated control is to achieve the desired in-cylinder condition during transient states. Given this fact, control of the in-cylinder condition is vital for an engine using multiple combustion modes. Good control of the in-cylinder condition means good control of the combustion (knowing that fueling/injection control is nearly perfect), and therefore, good engine emissions and performance will be achieved.

Figure 4:
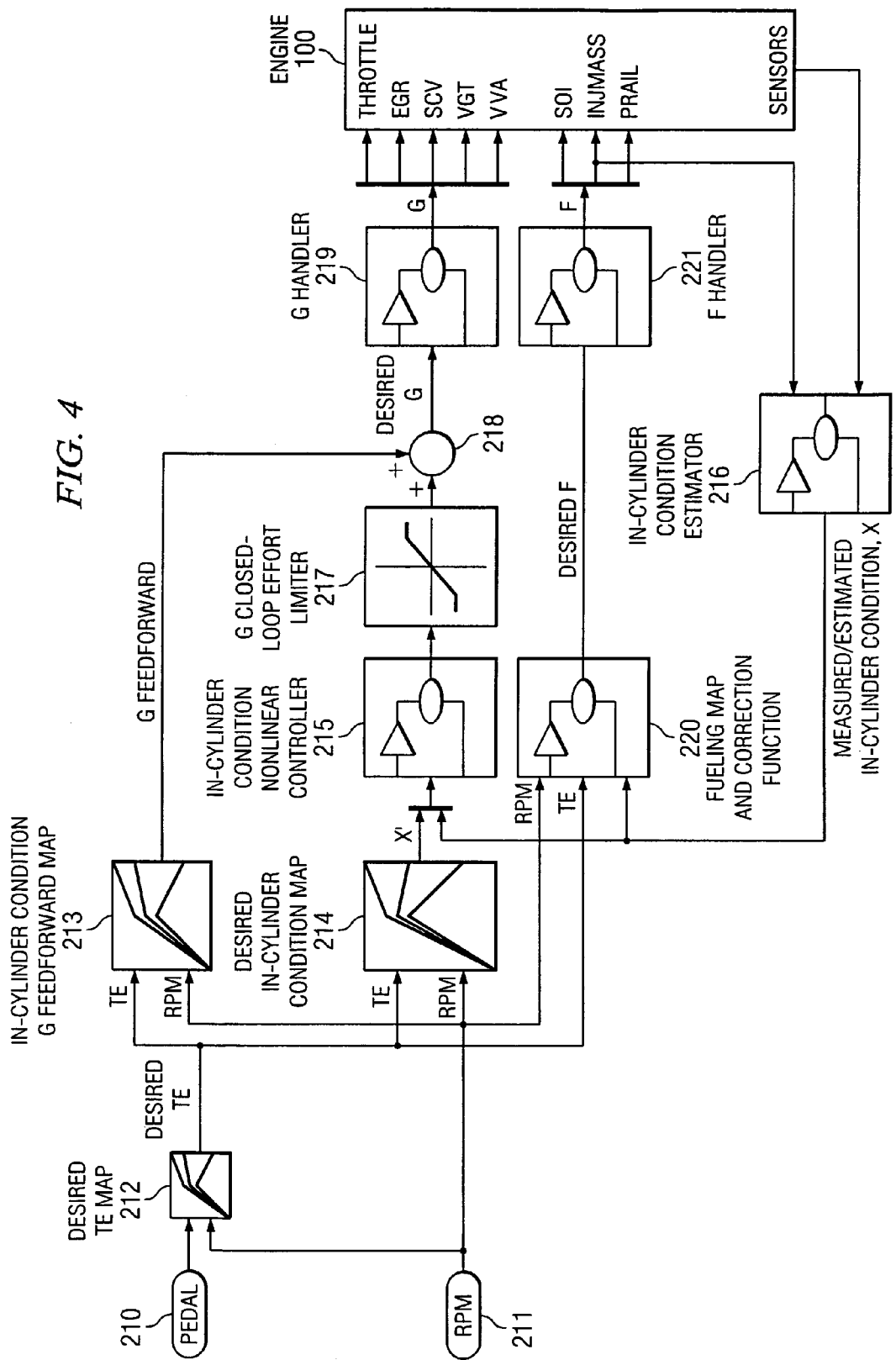
FIG. 4 illustrates a control system in accordance with the invention.

FIG. 4 illustrates the structure of a control system 200 in accordance with the invention. As explained below, system 200 provides non-linear modeling and control for an internal combustion engine system 100 having multiple combustion modes. It should be understood that system 200 may be implemented with appropriate data processing, logic, and storage devices, and may be a stand alone control unit or integrated with other engine control processing.

The in-cylinder condition is controlled by gas handling devices through two paths. One path is the feed forward contribution, which is determined by the engine speed (RPM) and desired torque, T. The desired torque is determined from pedal position data 210 and engine speed (RPM) data 211. These inputs are delivered to a map 212, which outputs the desired torque.

The desired torque and RPM are input to a feedforward map 213, which provides a gas handling feedforward vector, G. Examples of gas handling devices are throttle valve (Thr), EGR valve, swirl control valve (SCV), variable geometry turbocharger (VGT), and variable valve actuator (VVA). Thus, Vector G represents gas handling data: G=[throttle, EGR, VGT, SCV, VVA, etc.].

Maps 212 and 213 may be implemented with various memory storage devices. For example, maps 212 and 213 could be implemented as look up tables or other means for accessing data.

The second path is the closed-loop feedback contribution, which is decided by a nonlinear in-cylinder condition controller 215. Controller 215 operates in response to data from a desired in-cylinder condition map 214 and a measured/estimated in-cylinder condition 216.

The desired in-cylinder condition map 214 is dictated by the desired engine combustion mode. It receives torque and engine speed data, and its output may be represented by an in-cylinder condition vector X. Specifically, X=[air mass, EGR mass, swirl level, temperature, etc.].

Controller 215 receives Vector X data and the data from estimator 216. Its output is delivered to a limiter 217, which delivers its output to logic circuitry 218, which uses the feedforward vector G and the closed loop vector G to provide a desired G vector. A G vector handler 219 handles the delivery of engine control data to appropriate controllers and actuators of engine 100.

The vector of fueling parameters, F, which consists of injection pattern (single injection, double injection, etc), injection timings, injection quantity, and injection pressure, is determined by engine speed, RPM, desired torque, T (which is a function of engine speed and pedal position), measured/estimated in-cylinder condition from estimator 216, and the desired combustion mode. These data are delivered to a fueling map and correction function 220.

An F vector handler 221 handles the delivery of engine control data to appropriate controllers and actuators of engine 100.

The controlled in-cylinder condition, as represented by Vector G, and the appropriately calibrated fueling, as represented by Vector F, make the engine 100 produce the desired torque.

In this control system 200, the "in-cylinder condition estimator" 216 acts as a "sensor" to provide the controller with full-state feedback information about the in-cylinder condition. Estimator 216 provides reasonably accurate in-cylinder condition information in real-time. The estimator 216 could consist of physics-based models and/or data-based models. "Physics-based models" are derived from physics laws, and "data-based models" are generated from experimental data.

The nonlinear in-cylinder controller 215 is based on a dynamic in-cylinder condition model, different from the existing conventional engine intake system dynamic model developed for the conventional combustion mode only. The dynamic in-cylinder condition model here includes more variables (such as intake manifold temperature etc.), which makes it applicable for alternative multiple combustion modes.

In-cylinder condition control is a multiple-input-multiple-output (MIMO), coupled nonlinear system. Classical linear control approaches, such as a PID controller with ad hoc control, do not produce satisfactory performance. Advanced sophisticated MIMO nonlinear state-space control design approaches are required in order to simultaneously meet the real-world driveability and emission requirements. Depending on the combustion modes employed by the engine, the in-cylinder condition can be defined as a multi-variable vector that spans the system state space.

For example, the following equation shows that the in-cylinder condition as defined by the in-cylinder oxygen mass, in-cylinder inert gas mass, and temperature.

$$x = \text{InCylCond} = [M_{Oxy}, M_{Inert}, T, \ldots]^T$$

These three parameters are for purposes of example, and different or other parameters could be used.

Figure 5:
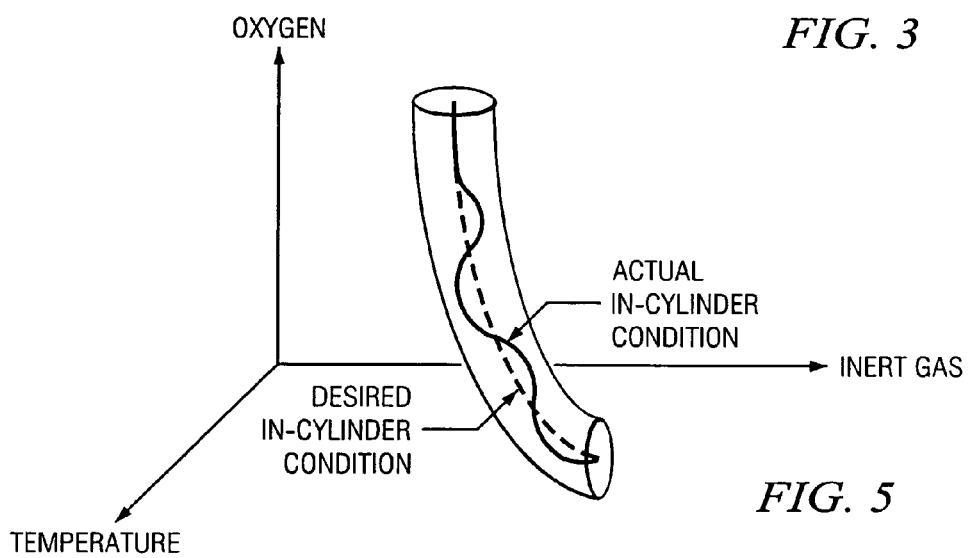
FIG. 5 illustrates the in-cylinder condition of FIG. 4, defined as a three state vector.

FIG. 5 illustrates an example of the in-cylinder condition defined as a three-state vector [Oxygen amount, Inert gas amount, Temperature]. The dotted line indicates the desired in-cylinder condition trajectory in this state space for different combustion modes. If we can control the actual in-cylinder condition trajectory (indicated as the solid line) inside the manifold around the desired trajectory, good engine performance (smooth torque) and emissions will be achieved all the time.

To ensure controllability of the in-cylinder condition, InCylCond, the engine is equipped with gas handling devices correspondingly, which constitute a system input vector. For example, the following equation shows the system input with five different gas handling devices. These five parameters are for purposes of example, and different or other parameters could be used.

$$u = [\theta_{Thr}, \theta_{EGR}, \theta_{SCV}, \theta_{VGT}, \phi_{VVA}]^T$$

The dynamics of the system can be described as the following equation, and in FIG. 6.

$$\frac{d(\text{InCylCond})}{dt} = f(\text{InCylCond}) + g(\text{InCylCond})u$$

Based on these system dynamics, nonlinear controller 215 can be designed for robust control of the engine system 100. Controller 215 may be implemented with appropriately programmed logic and/or processing devices, and may include features such as sliding mode control and full-state feedback linearization.

The engine modeling and control system 200 represents a general approach for control of an engine running with multiple combustion modes. System 200 can be adapted to various engines having different combinations of combustion modes.

Referring again to FIG. 3, to control the in-cylinder condition, more gas handling devices are added on the engine. However, each gas handling device has a different level of control authorities to different in-cylinder condition variables (for example, EGR valve has higher control authority to in-cylinder inertia gas amount than the intake air throttle valve). The effectiveness of each gas handling device changes with the operation condition/system state.

FIG. 7 illustrates the variation of the effectiveness of the throttle valve versus intake manifold pressure at different opening positions. Coordinated control among these gas handling devices is essential. As mentioned above, engine combustion is sensitive to in-cylinder conditions, especially for the newly developed alternative combustion modes, which are very close to the edge of unstable combustion. To minimize the overshooting/undershooting of the in-cylinder condition and reduce the coupling effect of different actuators during the in-cylinder condition tracking control, utilization of the gas handling devices is prioritized according to their levels of control authorities over the in-cylinder condition variables at different operating conditions. By doing this, the in-cylinder condition convergence speed can be improved and the effect of coupling can be minimized.

What is claimed is:

1. A control system for an internal combustion engine having multiple combustion modes, comprising:
   a feedforward path for providing gas handling feed forward data;
   a closed loop feedback path for providing gas handling feedback data;

logic for combining the data from the feedforward path and the feedback path, thereby providing final desired gas handling data;

a gas data handler for delivering gas control data to the engine;

a fuel parameter control path for providing desired fuel parameter data;

a fuel data handler for delivering fuel control data to the engine; and an in-cylinder condition estimator for delivering estimated or measured in-cylinder condition data to the feedback path and the fuel parameter control path.

2. The system of claim 1, wherein the in-cylinder condition data is data representing one or more of the following conditions: in-cylinder oxygen amount, in-cylinder inert gas amount, EGR mass, temperature, and swirl level.

3. The system of claim 1, wherein the feedforward path provides the gas handling feedforward data based on engine speed and torque.

4. The system of claim 1, wherein the feedforward path maps engine speed and torque to the gas handling feedback data.

5. The system of claim 1, wherein the gas handling data is data representing control of one or more of the following devices: throttle valve, EGR valve, swirl control valve, turbocharger, valve actuator.

6. The system of claim 1, wherein the fuel control data is data representing one or more of the following conditions: injection pattern, injection timing, injection quantity, injection pressure.

7. A method of controlling an internal combustion engine having multiple combustion modes, comprising:

using a feedforward path for providing gas handling feedforward data;

using a closed loop feedback path for providing gas handling feedback data;

combining the data from the feedforward path and the feedback path, thereby providing final desired gas handling data;

using a gas data handler for delivering gas control data to the engine;

using a fuel parameter control path to provide desired fuel parameter data;

using a fuel data handler for delivering fuel control data to the engine; and delivering estimated or measured in-cylinder condition data to the feedback path and the fuel parameter control path.

8. The method of claim 7, wherein the in-cylinder condition data is data representing one or more of the following conditions: in-cylinder oxygen amount, in-cylinder inert gas amount, EGR mass, temperature, and swirl level.

9. The method of claim 7, wherein the feedforward path provides the gas handling feedforward data based on engine speed and torque.

10. The method of claim 7, wherein the feedforward path maps engine speed and torque to the gas handling feedforward data.

11. The method of claim 7, wherein the gas handling data is data representing control of one or more of the following devices: throttle valve, EGR valve, swirl control valve, turbocharger, valve actuator.

12. The method of claim 7, wherein the fuel control data is data representing one or more of the following conditions: injection pattern, injection timing, injection quantity, injection pressure.

* * * * *